United States Patent
Hayakawa

(10) Patent No.: US 6,607,295 B2
(45) Date of Patent: Aug. 19, 2003

(54) VEHICLE HEADLAMP

(75) Inventor: Michihiko Hayakawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/131,282

(22) Filed: Apr. 23, 2002

(65) Prior Publication Data

US 2003/0090906 A1 May 15, 2003

(30) Foreign Application Priority Data

Apr. 24, 2001 (JP) ................................ P. 2001-126285

(51) Int. Cl.⁷ .................................................. F21V 7/00
(52) U.S. Cl. ..................... 362/517; 362/509; 362/516; 362/299; 362/346; 362/538; 362/539
(58) Field of Search .............................. 362/517, 509, 362/538, 516, 539, 277, 299, 300, 311, 346

(56) References Cited

U.S. PATENT DOCUMENTS 6,170,970 B1 * 1/2001 Eto ............................ 362/539
6,280,071 B1 * 8/2001 Yamamoto et al. ......... 362/359
6,325,529 B1 * 12/2001 Ito .............................. 362/539

FOREIGN PATENT DOCUMENTS

JP    Hei. 1-159902    6/1989
JP    2000-207918     7/2000

* cited by examiner

Primary Examiner—Sandra O'Shea
Assistant Examiner—Ronald E. DelGizzi
(74) Attorney, Agent, or Firm—Fish & Richardson PC

(57) ABSTRACT

A first auxiliary reflector 36 is provided above the optical axis Ax between a reflector of a lamp unit 20 and projection lens 28, and under the optical axis Ax, a second auxiliary reflector 44 is formed. An auxiliary luminous distribution pattern is formed at center area of a high-beam luminous distribution pattern additionally by reflecting forward at the second auxiliary reflector 44 after direct light directing to forward and obliquely upward from a light source 22a is reflected downward at the first auxiliary reflector 36 at the time of high-beam emission. Because of that, at the low-beam emission, an area close cut-off line at opposite lane side of the low-beam luminous distribution pattern does not brighten more than necessity, further, luminous intensity of a part of the area at the hot zone of the high-beam luminous distribution pattern is obtained enough.

12 Claims, 15 Drawing Sheets

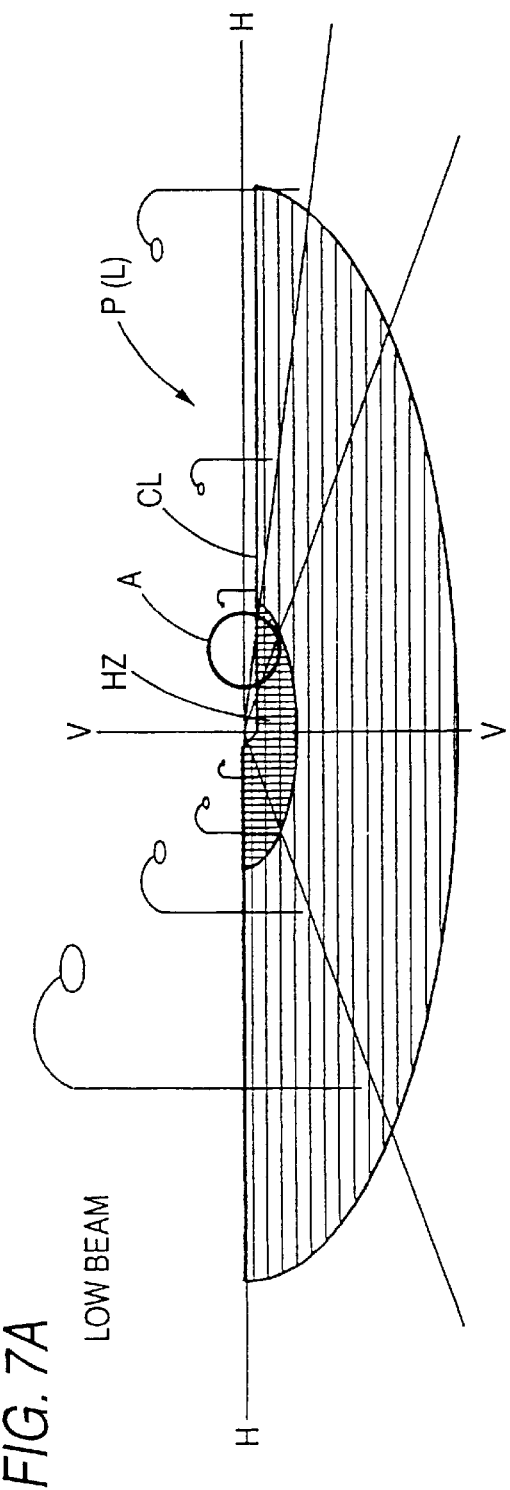
FIG. 7A  LOW BEAM
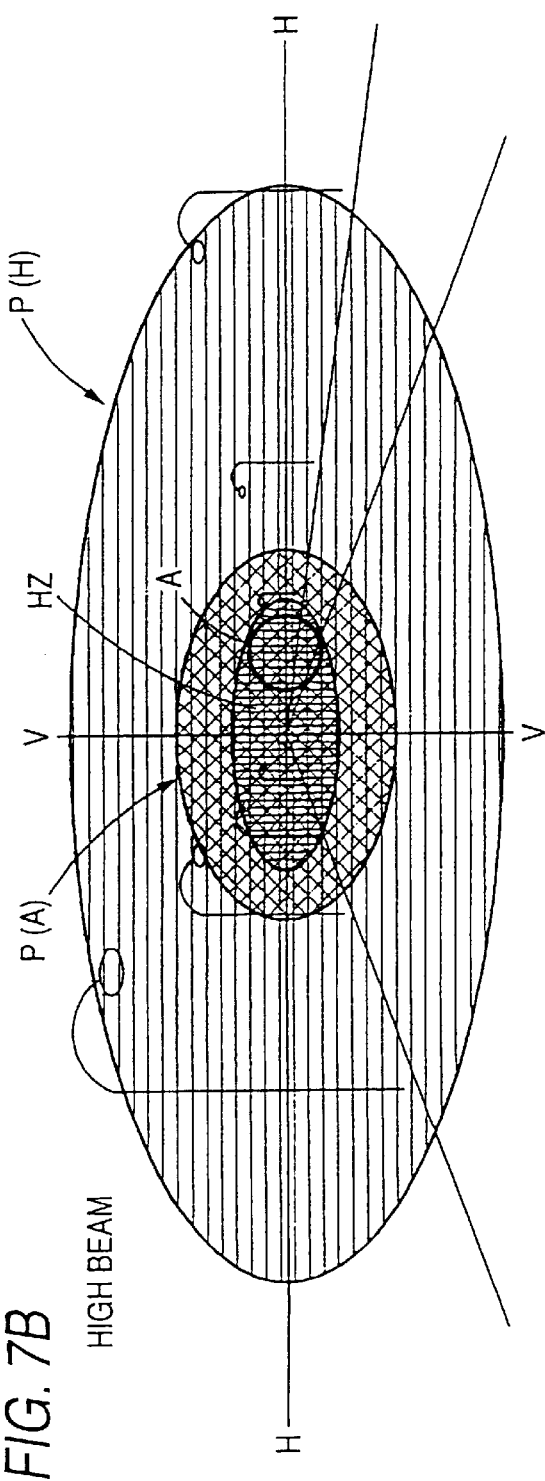
FIG. 7B  HIGH BEAM

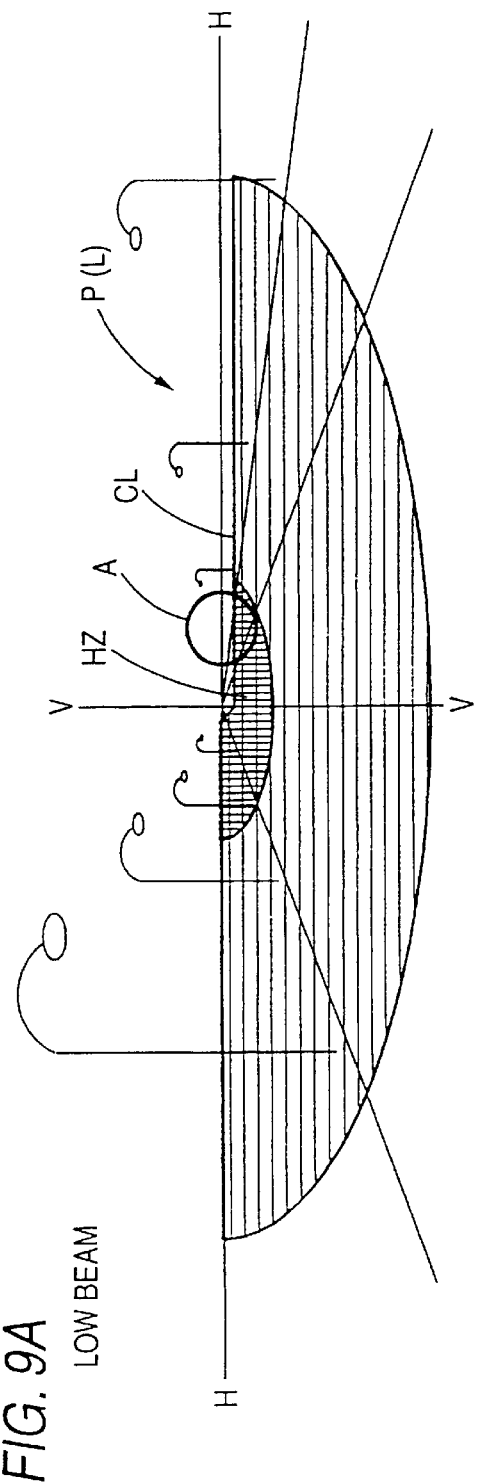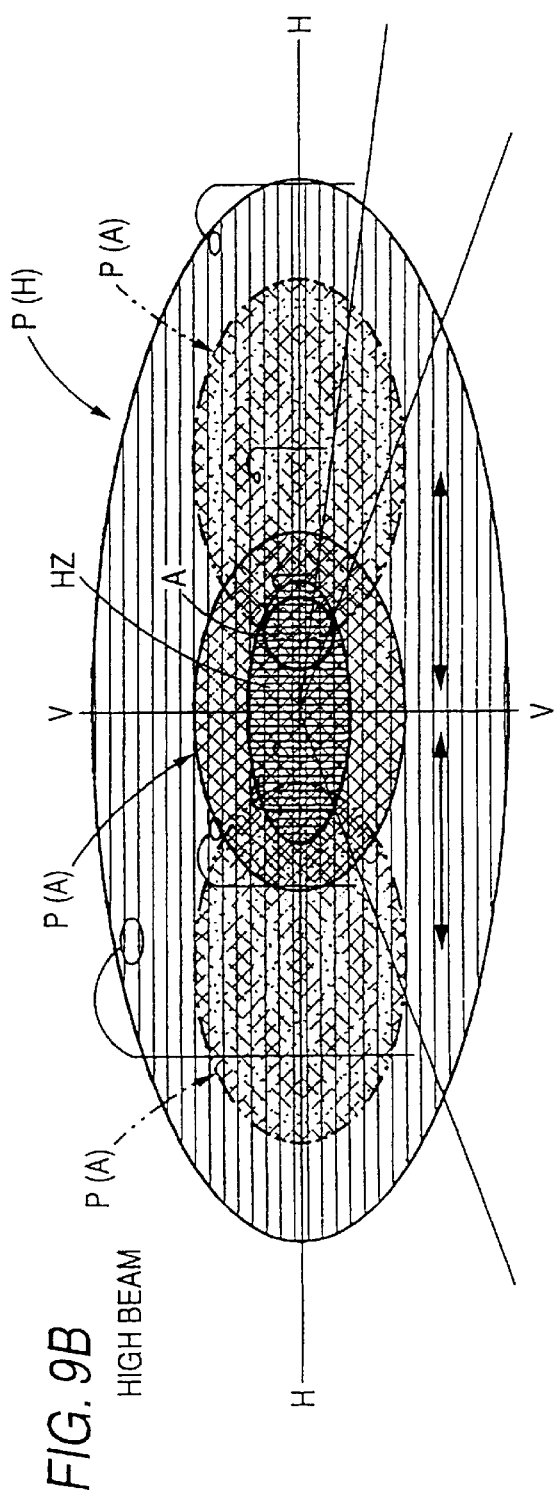
FIG. 9A LOW BEAM
FIG. 9B HIGH BEAM

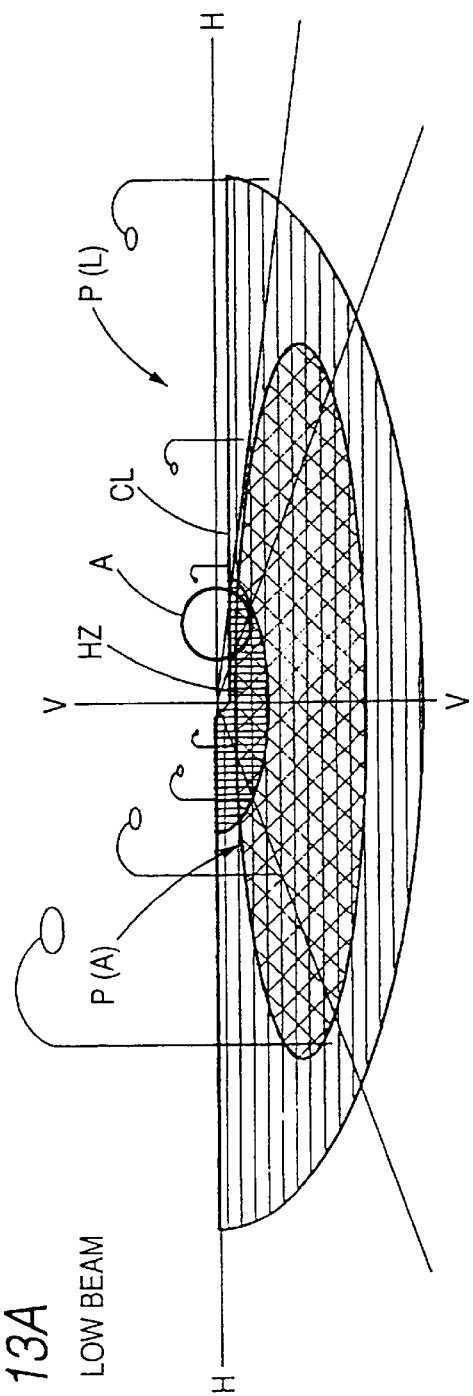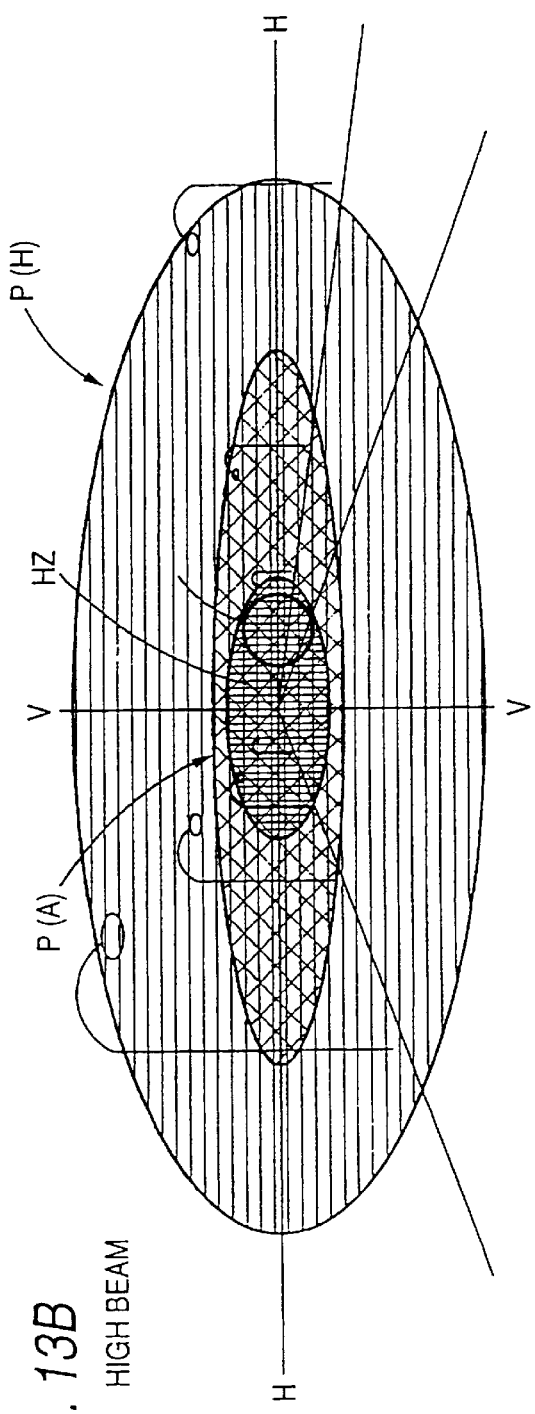
FIG. 13A LOW BEAM
FIG. 13B HIGH BEAM

LOW BEAM

HIGH BEAM

VEHICLE HEADLAMP

BACKGROUND OF THE INVENTION

The present invention relates to a vehicle headlamp having a so-called projector type lamp unit.

Heretofore, there is a known vehicle headlamp so arranged as to allow switching of low and high beams by moving a shade. For example, JP-A-2000-207918 discloses a vehicle headlamp having a beam switching mechanism of such a shade driving type.

The beam switching mechanism of the shade driving type has been applied to a so-called parabolic lamp unit in the vehicle headlamp mentioned in the above Japanese Patent Publication. However, the beam switching mechanism of the shade driving type is also applicable to the projector type lamp unit.

Nevertheless, in the case of the projector type lamp unit, because the image of a light source for forming a luminous distribution pattern becomes larger than what is produced in the parabolic lamp unit due to its structure, in case where switching of beams is carried out by the shade driving, there develops a problem of making it infeasible to sufficiently increase luminous intensity in a hot zone (high luminous intensity area) at the time of high-beam emission.

The aforesaid problem will be explained in detail as follows:

FIGS. 15A and 15B show luminous distribution patterns formed by beam emission from a projector type lamp unit to which a beam switching mechanism of a shade driving type is applied: FIG. 15A refers to a low-beam luminous distribution pattern; and FIG. 15B to a high-beam luminous distribution pattern.

In a low-beam luminous distribution pattern P(L)' of FIG. 15A, the brightness of an area A near a cut-off line CL on the opposite lane side is preferably kept at a predetermined value or lower in view of preventing glare from being given to an oncoming car driver. In a high-beam luminous distribution pattern P(H)' of FIG. 15B, on the other hand, the area A is preferably made as bright as possible as part of the hot zone (high luminous intensity area)

Thus, conflicting demands of light and shade are placed on the area A in both cases of low and high beams and it is considerably difficult to satisfy such demands only by relying on the presence of a shade in the projector type lamp unit in which the image of the light source grows larger. In this case, the problem is that brightness of the hot zone at the time of high-beam emission will have to be sacrificed to a certain degree in view of assigning priority to preventing glare from being given to an oncoming car driver.

SUMMARY OF THE INVENTION

An object of the invention is to provide a vehicle headlamp which has a projector type lamp unit for emitting beams forward with predetermined luminous distribution patterns and is capable of improving the luminous intensity of a hot zone at the time of high-beam emission after due consideration for preventing glare from being given to an oncoming car driver at the time of low-beam emission.

The invention is intended to accomplish the object above by providing two kinds of reflector in the respective predetermined positions.

According to the invention, a vehicle headlamp for use in emitting beams forward with predetermined luminous distribution patterns by using a lamp unit comprising a light source arranged on an optical axis extending in the longitudinal direction of a vehicle, a reflector for reflecting light from the light source forward a little to the optical axis, a projection lens provided in front of the reflector, and a shade which is provided between the projection lens and the reflector and used for shading part of the light reflected from the reflector, wherein a first auxiliary reflector which is provided between the reflector above the optical axis Ax and the projection lens and used for reflecting direct light from the light source downward, a second auxiliary reflector which is provided between the reflector under the optical axis and the projection lens and used for reflecting the light reflected from the first auxiliary reflector forward.

The kind of the light source is not limited to a specific one but may be any light source, for example, the discharge light emitting portion of a discharge bulb, the filament of an incandescent bulb such as a halogen bulb.

On condition that the first auxiliary reflector is provided between the reflector above the optical axis Ax and the projection lens and used for reflecting direct light from the light source downward, the configuration and the size, for example, of the reflective surface are not limited to specific arrangement.

On condition that the second auxiliary reflector is provided between the reflector under the optical axis Ax and the projection lens and used for reflecting the light reflected from the first auxiliary reflector forward, the configuration and the size, for example, of the reflective surface are not limited to specific arrangement.

With the arrangement shown above, the vehicle headlamp according to the invention has the projector type lamp unit and the first auxiliary reflector is provided between the reflector above the optical axis Ax and the projection lens and used for reflecting direct light from the light source downward, whereas the second auxiliary reflector is provided between the reflector under the optical axis Ax and the projection lens and used for reflecting the light reflected from the first auxiliary reflector forward, so that the following operation/working effect are attainable.

In the projector type lamp unit, though the direct light directed from the light source forward and obliquely upward is not generally used for forming the luminous distribution pattern, the direct light is reflected downward by the first auxiliary reflector first and then reflected forward by the second auxiliary reflector, whereby as the luminous distribution pattern emitted forward from the lamp unit, the luminous distribution pattern (auxiliary luminous distribution pattern) formed by the light reflected from the second auxiliary reflector can be added to the basic luminous distribution pattern formed by the light reflected from the reflector and passed through the projection lens.

At the time of high-beam emission, the luminous intensity of the hot zone can be improved satisfactorily by adding the auxiliary luminous distribution pattern to the basic luminous distribution pattern and then using the auxiliary luminous distribution pattern for the formation of the hot zone. At the time of low-beam emission, on the other hand, glare can be prevented from being given to an oncoming car driver by using only the basic luminous distribution pattern without adding the auxiliary luminous distribution pattern thereto.

Thus, in the vehicle headlamp that causes the projector type lamp unit to emit beams forward with the predetermined luminous distribution patterns according to the invention, it is possible to attempt to improve the luminous intensity of the hot zone at the time of beam emission while glare is prevented from being given to the oncoming car driver at the time of low-beam emission.

Although the configurations of the first and second auxiliary reflectors are not limited to specific ones as described above, the light reflected from the first auxiliary reflector is readily controllable by the second auxiliary reflector by forming the reflective surface of the first auxiliary reflector into an elliptic spherical surface having a first focal point close to the light source and forming the second auxiliary reflector into a secondary curved surface (i.e., a parabolic, an elliptic or a hyperbolic curved surface) having a focal point close to the second focal point of the reflective surface of the first auxiliary reflector.

With the arrangement above, the shade is movably provided whereby to assume a shade position for shading part of the light reflected from the reflector and an exposure position for releasing the shading of the light and wherein when in the shade position, the shade is used for shading the light directed to the second auxiliary reflector from the first auxiliary reflector, whereas when in the exposure position, the shade is used for releasing the shading of the light directed to the second auxiliary reflector from the first auxiliary reflector. Thus, beam emission is carried out with the basic luminous distribution pattern at the time of low-beam emission, whereas the auxiliary luminous distribution pattern can be added to the basic luminous distribution pattern at the time of high-beam emission without necessitating a new mechanism.

In this case, the provision of a through-hole through which the light directed to the second auxiliary reflector from the first auxiliary reflector is allowed to pass therethrough only when the shade is in the exposure position makes it simply possible to shade the light directed to the second auxiliary reflector from the first auxiliary reflector and to release the shading of the light.

With the arrangement above, the direction of beam emission with the auxiliary luminous distribution pattern can be varied by movably providing the second auxiliary reflector, whereby the beam emission can be controlled in a delicate manner corresponding to the travel condition of the vehicle. At this time, the mode of moving the second auxiliary reflector is not specifically restrictive but may inclusive of, for example, pivoting on the horizontal or vertical axis, or linear reciprocating movement in lateral, vertical and longitudinal directions.

When the second auxiliary reflector is movably provided, the auxiliary luminous distribution pattern can be added to the basic luminous distribution pattern at the time of not only high-beam emission but also low-beam emission by switching the directions of the light reflected from the second auxiliary reflector between the high-beam emission and the low-beam emission without shading the light directed to the second auxiliary reflector from the first auxiliary reflector even at the time of low-beam emission.

With the projector type lamp unit as a lamp unit for special use in low-beam emission, the auxiliary luminous distribution pattern formed by the light reflected from the second auxiliary reflector may be addition to the basic luminous distribution pattern (i.e., low-beam luminous distribution pattern) always or timely.

BRIEF DESCRIPTION OF THE DRAWINGS

FIGS. 7A and 7B are views showing perspectively luminous distribution pattern formed on imaginary vertical screen arranged at position of 25 meters ahead by beam emission from the lamp unit;

FIGS. 9A and 9B are views showing perspectively a luminous distribution pattern formed on imaginary vertical screen arranged at position of 25 meters ahead by beam emission from the lamp unit according to the variation;

FIGS. 13A and 13B are views showing perspectively a luminous distribution pattern formed on imaginary vertical screen arranged at position of 25 meters ahead by beam emission from the lamp unit of the third embodiment;

DETAILED DESCRIPTION OF THE PREFERRED EMBODIMENTS

Embodiments of the invention will be described with reference to the drawings.

First, a first embodiment of the invention will be described.

Figure 1:
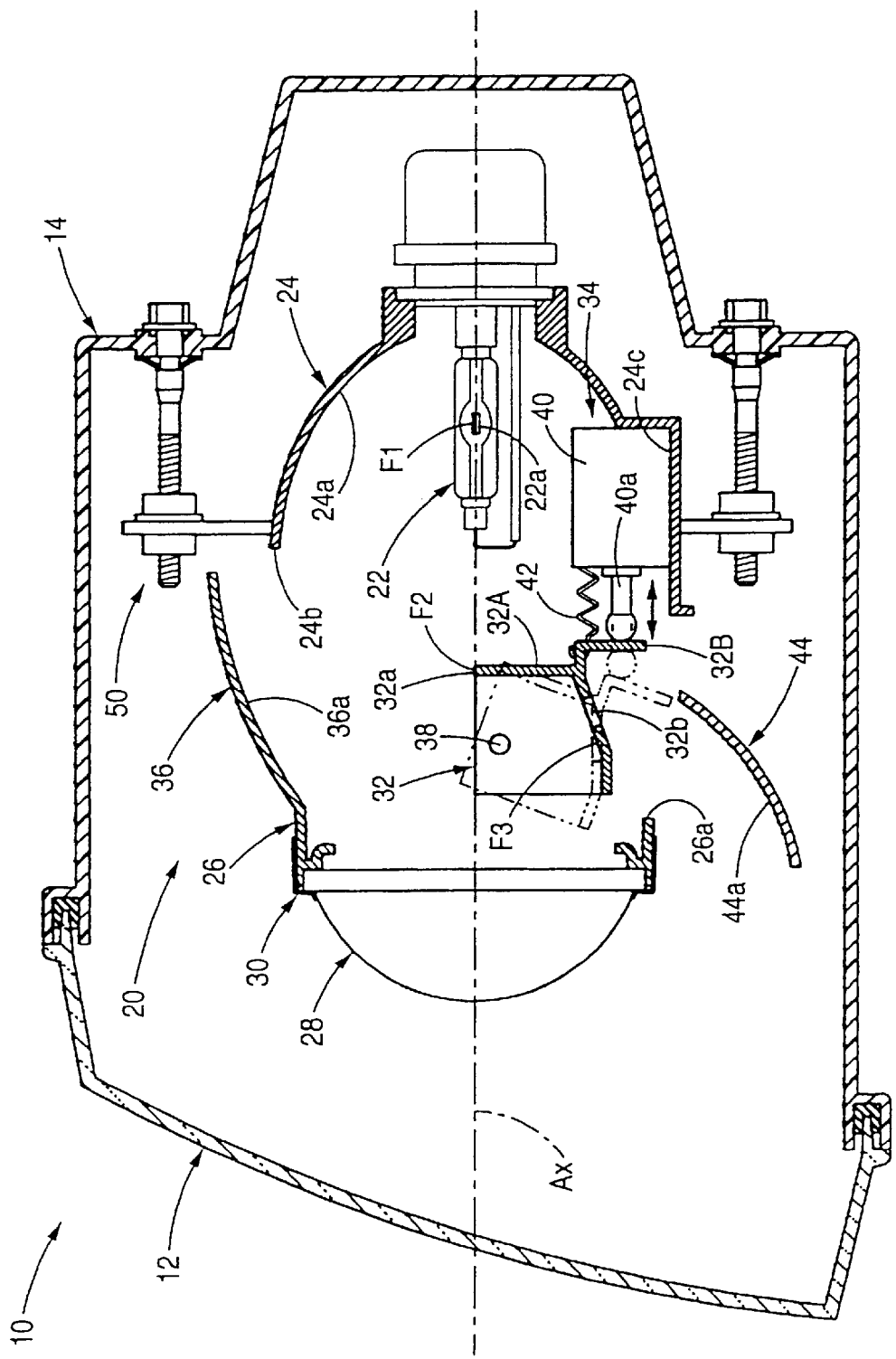
FIG. 1 is a side sectional view showing a vehicle headlamp according to a first embodiment of the invention.

FIG. 1 is a side sectional view of a vehicle headlamp embodying the invention.

As shown in FIG. 1, a vehicle headlamp 10 has a lamp unit contained in a lamp chamber formed with a see-through transparent cover 12 and a lamp body 14 in such a manner that the lamp unit 20 can be tilted vertically and horizontally via an aiming mechanism 50.

Figure 2:
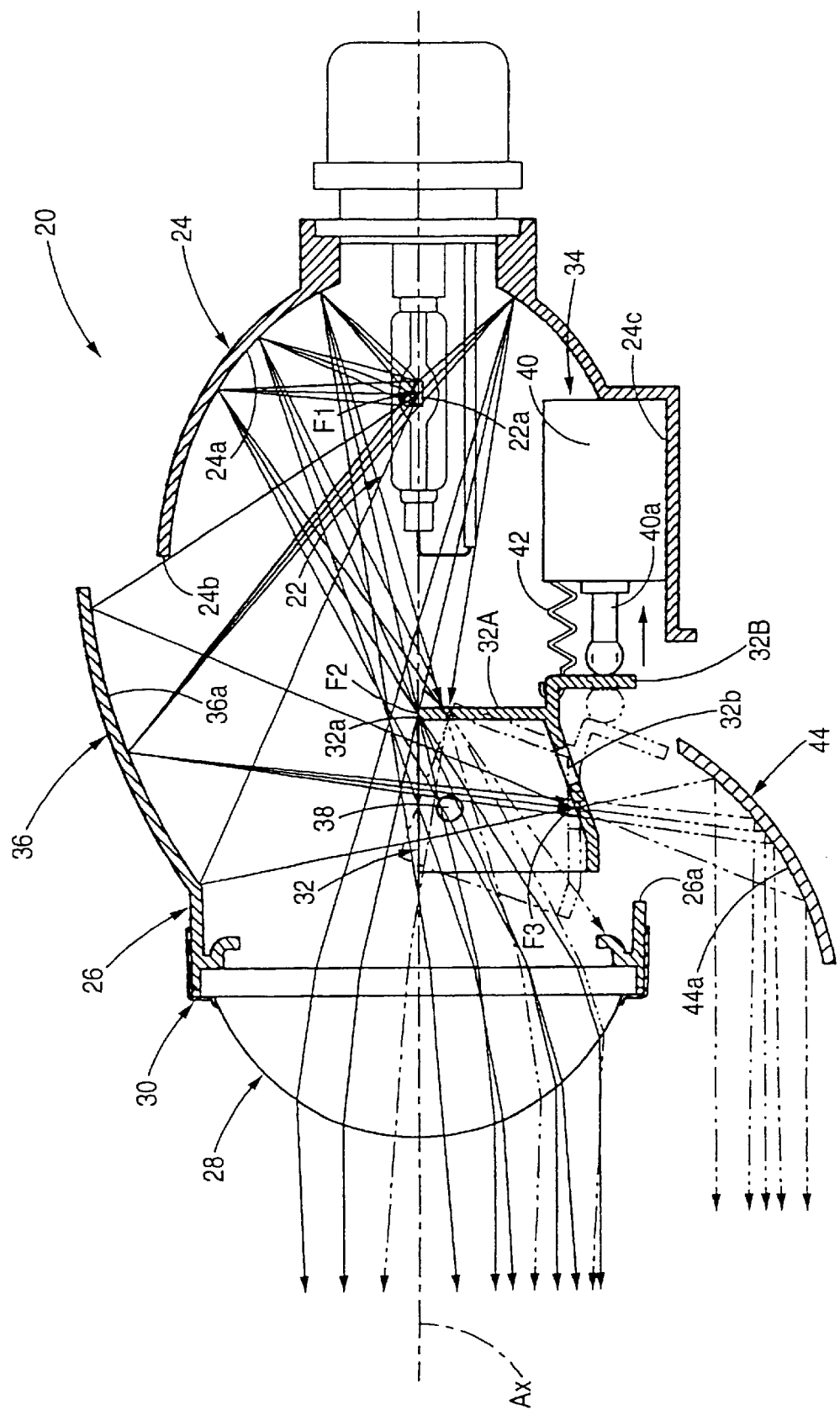
FIG. 2 is a side sectional view showing a single article of the lamp unit of the vehicle headlamp (No. 1)
Figure 3:
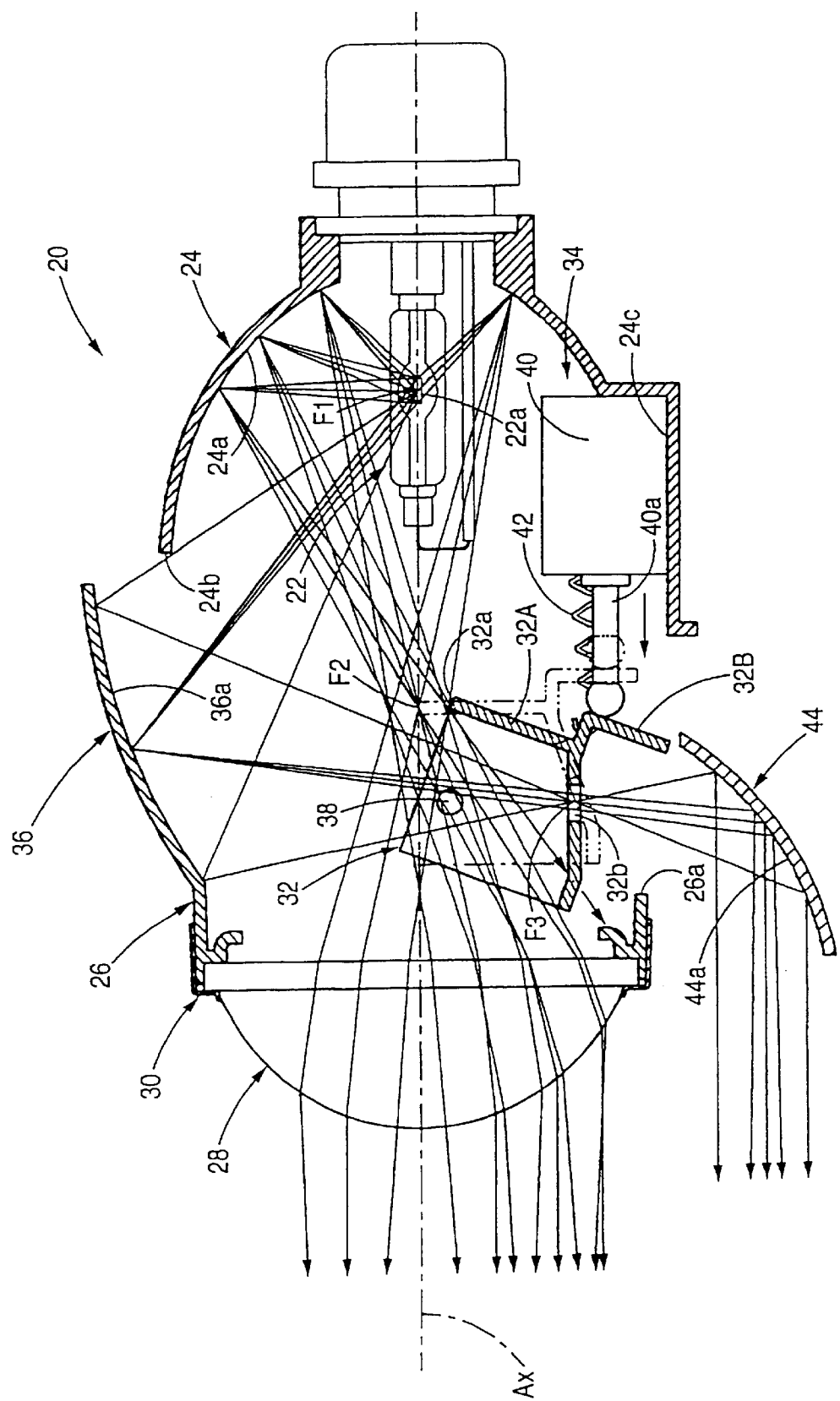
FIG. 3 is a side sectional view showing a single article of the lamp unit of the vehicle headlamp (No. 2)
Figure 4:
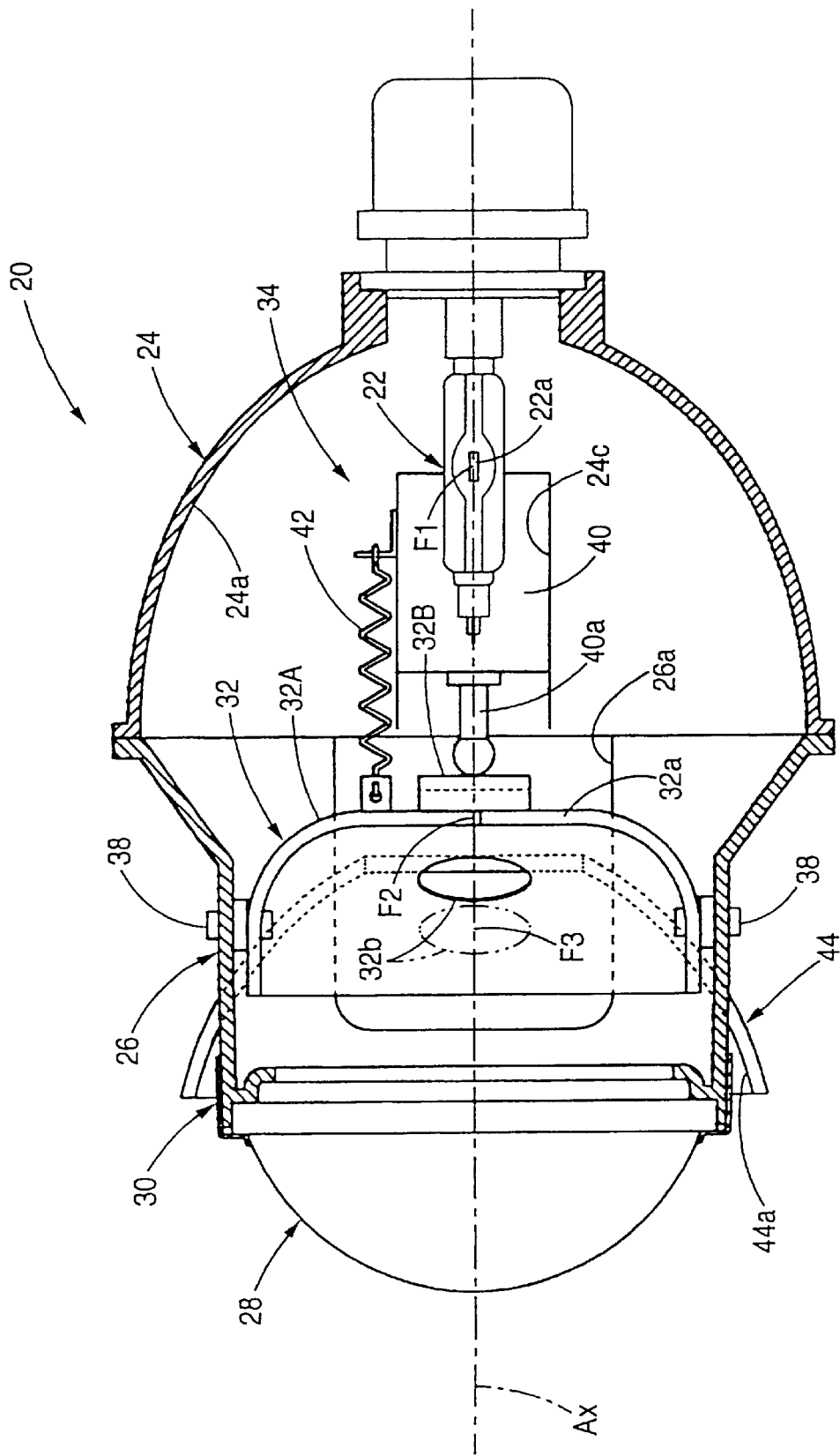
FIG. 4 is a horizontal sectional view showing a single article of the lamp unit.
Figure 5:
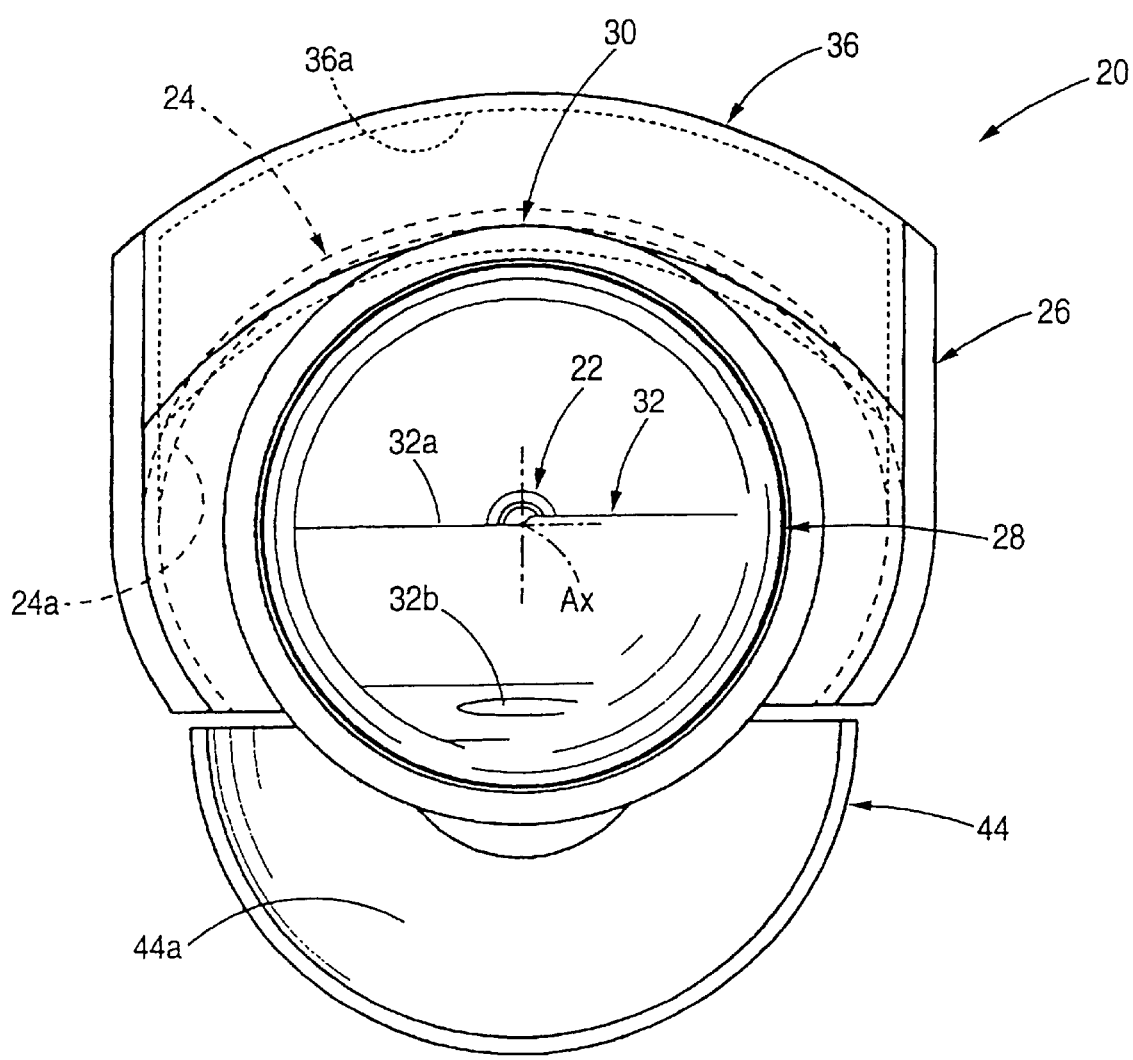
FIG. 5 is an elevational view showing a single article of the lamp unit.
Figure 6:
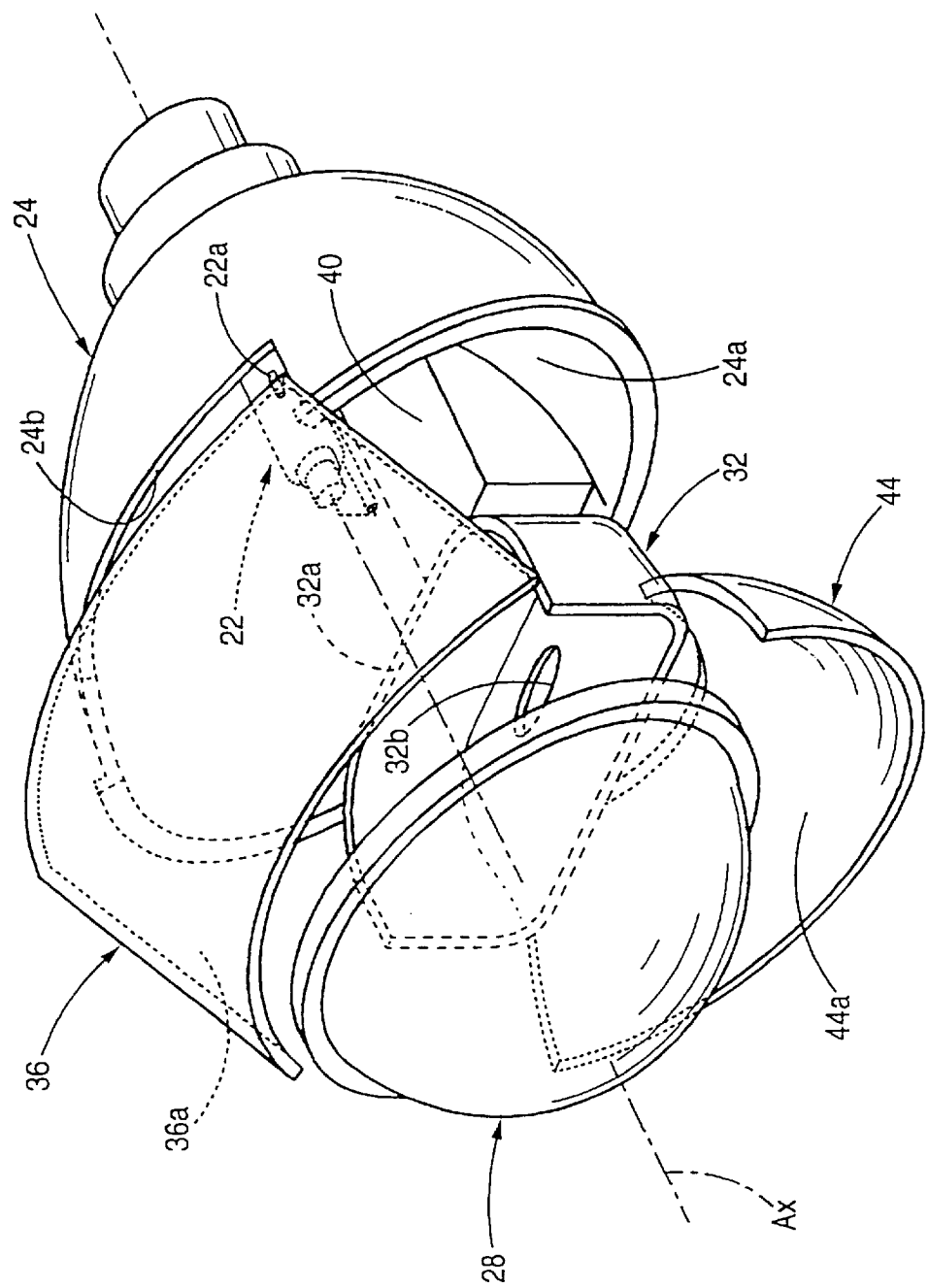
FIG. 6 is a perspective view showing component elements of the lamp unit.

FIGS. 2 and 3 are side sectional views of the lamp unit 20 as a separate unit; and FIGS. 4 and 5, a horizontal sectional and an elevational view thereof. Further, FIG. 6 is a perspective view showing component elements of the lamp unit 20.

As shown in the drawings, the lamp unit 20 is a projector type lamp unit comprising a discharge bulb 22, a reflector 24, a holder 26, a projection lens 28, a retaining ring 39, a shade 32 and a shade driving mechanism 34.

The discharge bulb 22 is a metal halide bulb and its discharge light emitting portion 22a (light source) is mounted on the reflector 24 so that the discharge light emitting portion is arranged coaxially with an optical axis Ax extending in the longitudinal direction of the vehicle.

The reflector 24 has a reflective surface 24a in the form of a substantially elliptic spherical surface with the optical axis Ax as the central axis. The reflective surface 24a is formed such that the section including the optical axis Ax is elliptical and that the eccentricity is made greater gradually from the vertical section to the horizontal section. However, the rear side apex of the ellipsis forming each of the sections is set in the same position. The light source 22a is positioned at the first focal point F1 of the ellipsis that forms the vertical section of the reflective surface 24a. Thus, the reflective surface 24a is so arranged as to reflect light from the light source 22a forward a little to the optical axis Ax and to substantially converge the light on the second focal point F2 of the ellipsis in the vertical section including the optical axis Ax then.

The holder 26 is formed into a cylinder extending forward from the front end opening of the reflector 24 and the rear end portion is fixedly supported by the reflector 24 and the front end portion fixedly supports the projection lens 28 via the retaining ring 30. A cutout portion 26a is formed in the lower end portion of the holder 26. Further, a first auxiliary reflector 36 is integrally formed with the holder 26 in the upper end portion of the holder 26. The first auxiliary reflector 36 has a reflective surface 36a in the form of a elliptic spherical surface and the first focal point is set in the same position as that of the first focal point F1 of the reflective surface 24a of the reflector 24. Moreover, the second focal point F3 of the first auxiliary reflector 36 is set in a predetermined position (as will be described later) under the optical axis Ax.

The front side of the projection lens 28 has a convex surface, whereas the rear side surface thereof is formed with a flat convex lens, and the rear side position of the focal point is disposed so as to coincide with the second focal point F2 of the reflective surface 24a of the reflector 24. Thus, the projection lens 28 causes the light reflected from the reflective surface 24a of the reflector 24 to pass therethrough by concentrating the reflected light a little to the optical axis Ax.

The shade 32 has a shade body portion 32A extending substantially along a vertical face perpendicularly crossing the optical axis Ax with both the right and left end portions and the lower end portion being rounded forward and a bracket portion 32B extending substantially downward from the lower end rear portion of the shade body portion 32A, and pivotally provided in the lower portion of the internal space of the holder 26. More specifically, the shade 32 is supported by the holder 26 via a pair of pivotal pins 38 in both the upper right- and left-portions of the shade body portion 32A, so that the shade 32 is able to pivot between a shade position (shown by a solid line in FIG. 2 and by a chain double-dashed line in FIG. 3) and a exposure position (shown by a solid line in FIG. 3 and by a chain double-dashed line in FIG. 2) around a horizontal axial line connecting both pivotal pins 38.

Further, the shade 32 is arranged so that when the shade 32 is in the shade position, the upper end edge 32a of the shade body portion 37 passes through the second focal point F2 in order to eliminate the upward light emitted from the lamp unit 20 by shading part of the light reflected from the reflective surface 24a whereby to obtain the low-beam (the beam shown by the solid line in FIG. 2) emitted downward with respect to the optical axis Ax. Thus, the leftward low-beam luminous distribution pattern P(L) having a so-called Z-type cut-off line CL that is laterally on different levels is formed as shown in FIG. 7A.

When the shade 32 is in the exposure position, on the other hand, the shade 32 allows the upward emission of light from the lamp unit 20 by releasing the shading of the light reflected from the reflective surface 24a whereby to obtain the high-beam (shown by the solid line FIG. 3) emitted upward. Thus, the high-beam luminous distribution pattern P(H) is formed as shown in FIG. 7B. The areas shown by HZ in the low-beam luminous distribution pattern P(L) and the high-beam luminous distribution pattern P(H) are the hot zones (high luminous intensity area) in the luminous distribution patterns, respectively.

The shade driving mechanism 34 provides a solenoid 40 and an extension coil spring 42, and switches low-beam and high-beam by rotating the shade 32 between the shade position and the exposure position. The solenoid 40 is stored and fixed in a concave portion 24c formed at lower area of the reflector 24 at the state arranged so that a tip portion of a plunger 40a thereof contacts a blanket portion 32B of the shade 32 from rear side. The front-end portion of the extension coil spring 42 is stopped by the blanket portion 32B of the shade 32, and the rear-end thereof is stopped by a side wall portion of the body of the solenoid 40. The extension coil spring 42 forces the shade 32 by extension elastic force toward the shade position so as to keep always touching state of the blanket portion 32B and the plunger 40a.

A long sideways elliptical through-hole 32b is formed at position just under the optical axis Ax at lower wall rear end of the shade body portion 32A of the shade 32. The second focal point F3 of the reflective surface 36a of the first auxiliary reflector 36 is set to center position of the through-hole 32b when the shade 32 is at the exposure position.

A second auxiliary reflector 44 is fixed the holder 26 through a fixing means not shown close under the holder 26. A reflective surface 44a of the second auxiliary reflector 44 is constituted by paraboloid of revolution having the focal point at the position the second focal point F3 of the first auxiliary reflector 36.

Although direct light directing forward and obliquely upward from the light source 22a comes to the reflective surface 36a of the first auxiliary reflector 36 as shown in FIG. 2, light reflected at the reflective surface 36a converges on the second focal point F3 as the reflective surface 36a is formed in elliptical spherical surface shape. However, since the second focal point F3 is at a position off to front side from the through-hole 32b of the shade 32 when the shade 32 is at the shade position as shown in the figure, convergent light to the second focal point F3 is shaded by the shade body portion 32b. On the other hand, when the shade 32 is at the exposure position as shown in FIG. 3, convergent light to the second focal point F3 goes to downward from the through-hole 32b so as to come to the reflective surface 44a of the second auxiliary reflector 44 since the second focal point F3 positions at center of the through-hole 32b. The light reflected at the reflective surface 44a is emitted forward becoming parallel light because the incident light comes as divergent light from the second focal point F3, thereby an auxiliary luminous distribution pattern P(A) shown in FIG. 7B is formed at a center area of the high-beam luminous distribution pattern P(H).

As described above, the vehicle headlamp 10 according to the embodiment provides the projector type lamp unit 20, and the first auxiliary reflector 36 reflecting direct light forward from the light source 22a is provided between the reflector 24 and the projection lens 28 above the optical axis Ax. Further, between the reflector 24 and the projection lens 28, the second auxiliary reflector 44 reflecting the reflecting light from the first auxiliary reflector 36 forward is provided, thereby the following operation/working effect can be obtained.

That is, in the lamp unit 20, direct light directing forward and obliquely upward from the light source 22a is not used for forming the low-beam luminous distribution pattern P(L) or the high-beam luminous distribution pattern P(H). However, the auxiliary luminous distribution pattern P(A) is formed reflecting by the second auxiliary reflector 44 forward after reflecting the direct light downward by the first auxiliary reflector 36 in the embodiment. Therefore, the auxiliary luminous distribution pattern P(A) can be added to the high-beam luminous distribution pattern P(H) formed by light reflecting at the reflector 24 and permeating the projection lens 28 as basic luminous distribution pattern. Since the auxiliary luminous distribution pattern P(A) is formed additionally at center area of the high-beam luminous distribution pattern P(H) as shown in FIG. 7B, the hot zone HZ can be made brighter.

On the other hand, since the auxiliary luminous distribution pattern P(A) is not formed at the time of low-beam emission, only the low-beam luminous distribution pattern P(L) formed by light reflecting at the reflector 24 and permeating the projection lens as the basic luminous distribution pattern is used as shown in FIG. 7A. At this time, when the low-beam luminous distribution pattern P(L) is formed with luminous intensity distribution that an area A close cut-off line CL at opposite lane side does not brighten more than necessity, luminous intensity of a part of the area A at the hot zone of the high-beam luminous distribution pattern P(H) is not possibly obtained enough.

However, luminous intensity of the area A can be obtained by superimposing the auxiliary luminous distribution pattern P(A) as shown in FIG. 7B even if luminous intensity of the hot zone HZ formed by the high-beam luminous distribution pattern P(H) is not so high.

As the above, according to the embodiment, prevention of glare to an oncoming car driver at the low-beam luminous distribution pattern P(L) is designed, and further improvement of luminous intensity of the hot zone HS at the high-beam luminous distribution pattern P(H) is designed.

Further in the embodiment, the reflective surface 36a of the first auxiliary reflector 36 is formed in elliptic spherical surface shape having the first focal point F1 at the position of the light source 22a, and the reflective surface 44a of the second auxiliary reflector 44 is formed in paraboloid of revolution shape having a focal point at the second focal point F2 of the reflective surface 36a of the first auxiliary reflector 36, thereby reflecting light from the first auxiliary reflector 36 can be reflected and controlled easily by the second auxiliary reflector 44. Concretely, the auxiliary luminous distribution pattern P(A) is formed easily as a converging/distributing pattern.

Further in the embodiment, the shade 32 is provided rotationally so as to take the shade position shading a part of reflecting light from the reflector 24 and the exposure position releasing the shade. Light directing to the second auxiliary reflector 44 from the first auxiliary reflector 36 is shaded at the shade position, on the other hand at the exposure position, light directing to the second auxiliary reflector 44 from the first auxiliary reflector 36 is released. Therefore, beam emission is performed only by the low-beam luminous distribution pattern P(L) being the basic luminous distribution pattern at the low-beam emission, and on the other hand at the high-beam emission, the auxiliary luminous distribution pattern P(A) can be added to the high-beam luminous distribution pattern P(H) being the basic luminous distribution pattern without forming a new mechanism.

Moreover, since the invention is realized by forming the through-hole 32b permeating light directing to the second auxiliary reflector 44 from the first auxiliary reflector 36 only when the shade is a the exposure position at the shade 32, shading and releasing the shade of light directing to the second auxiliary reflector 44 from the first auxiliary reflector 36 can be performed with simple constitution.

Figure 8:
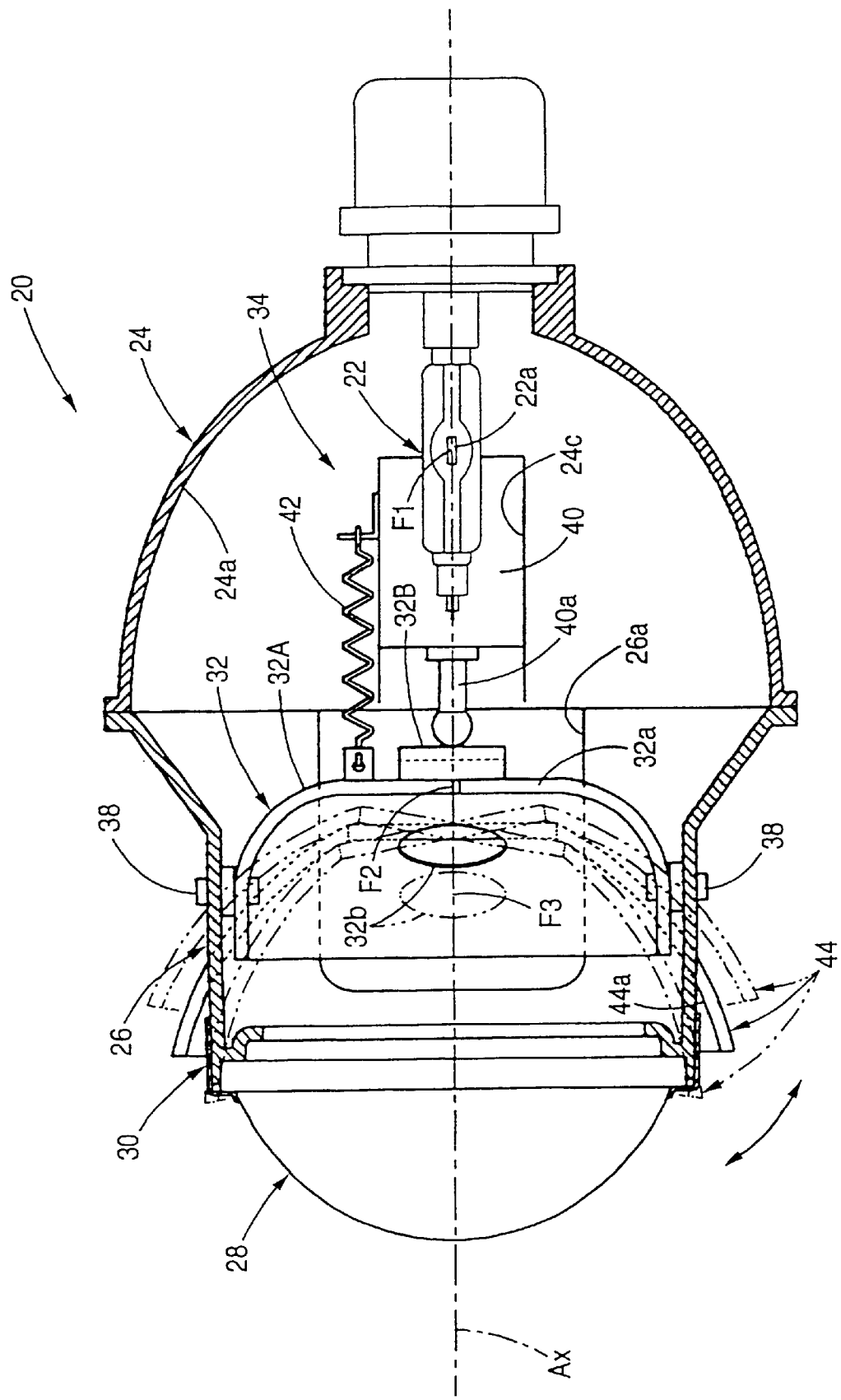
FIG. 8 is a similar view as FIG. 4, showing variation of the embodiment.

Although it is described that the second auxiliary reflector 44 is fixed at the holder 26 in the first embodiment, it is possible to provide the second auxiliary reflector 44 movably to the holder 26 or the reflector 24. For example, by supporting movably around vertical axis passing the second focal point F3 of the first auxiliary reflector 36 as shown in FIG. 8, direction of beam emission at the auxiliary luminous distribution pattern P(A) can be changed to right and left directions as shown in FIGS. 9A and 9B, thereby it is possible to control beam emission in a delicate manner corresponding to the travel condition of the vehicle.

Further, although it is described that the first auxiliary reflector 36 is formed integratedly with the holder 26 in the first embodiment, the first auxiliary reflector 36 may be fixed to the holder 26 or the reflector 24 constituting as an independent member.

Figure 10:
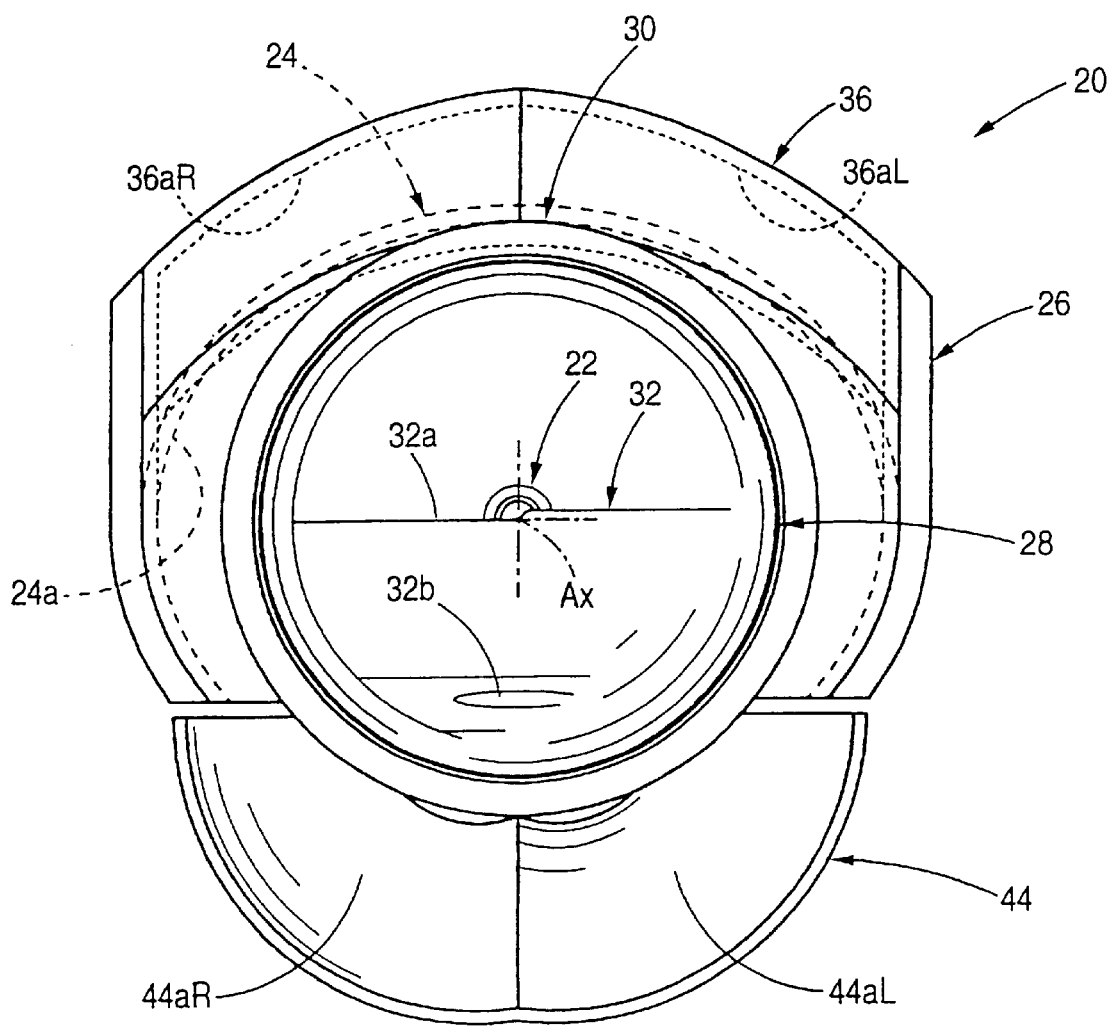
FIG. 10 is a similar view as FIG. 5, showing another variation of the embodiment.

It is possible that the first auxiliary reflector 36 has a pair of, right and left, reflective surfaces 36aL and 36aR, and that the second auxiliary reflector 44 has a pair of, right and left, reflective surfaces 44aL and 44aR as shown in FIG. 10. In this case, reflective light from the left side reflective surface 36aL of the first auxiliary reflector 36 comes to the right side reflective surface 44aR of the second auxiliary reflector 44, and reflective light from the right side reflective surface 36aR of the first auxiliary reflector 36 comes to the left side reflective surface 44aL of the second auxiliary reflector 44. Thus, direct light from the light source 22a reflects more and comes to the second auxiliary reflector 44 by the first auxiliary reflector 36, thereby flux of light used for emission of the auxiliary luminous distribution pattern can be increased.

Next, a second embodiment the invention will be described.

Figure 11:
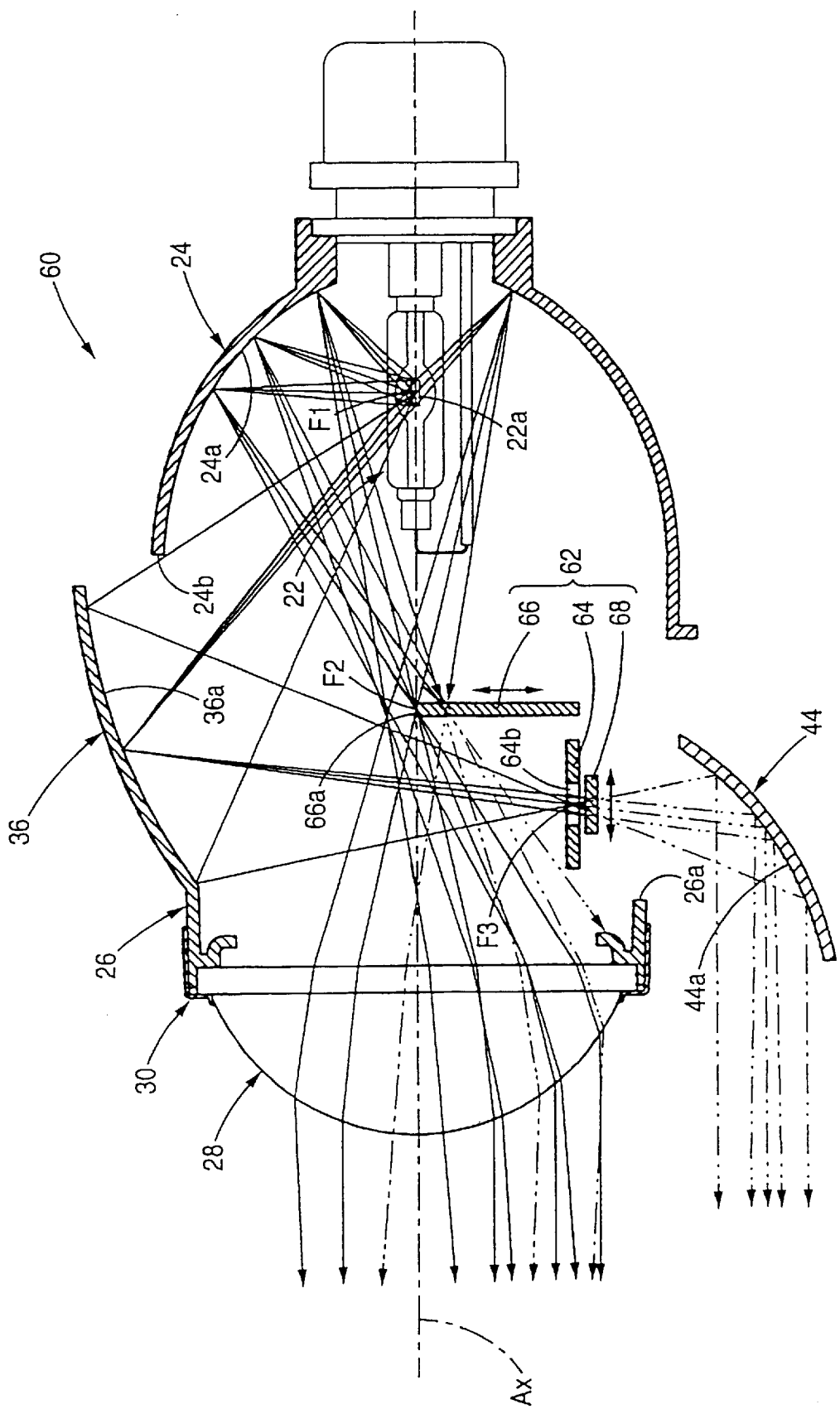
FIG. 11 is a side sectional view showing a single article of the lamp unit of the vehicle headlamp according to a second embodiment of the invention.

FIG. 11 is a side sectional view showing a single article of a lamp unit 60 of a vehicle headlamp according to the embodiment.

Although the lamp unit 60 according to the embodiment is similar as the lamp unit 20 according to the first embodiment as shown in the figure, constitution of a shade 62 is different from the first embodiment, That is, the shade 62 of the embodiment is made of a fixed shade portion 64, a first moving shade portion 66, and a second moving shade portion 68.

The fixed shade portion 64 is a plate member forming a long sideways elliptical through-hole 64b, and is fixed by the holder 62 in horizontal arrangement under the optical axis Ax. At this time, the fixed shade portion 64 is arranged so that center of the through-hole 64b is roughly agreed with the second focal point F3 of the first auxiliary reflector 36.

The first moving shade portion 66 is a plate member extending roughly along to vertical surface perpendicularly crossing the optical axis Ax, and is constituted so that shade position for low-beam emission and exposure position for high-beam emission are adopted selectively by moving up and down directions by a shade driving mechanism not shown. When the first moving shade portion 66 moves upward to the shade position, the upper end edge 66a is arranged so as to pass the second focal point F2 of the reflector 24.

The second moving shade portion 68 is a plate member provided close under the fixed shade portion 64 in horizontal arrangement, and is constituted so that shade position against light directing to the second auxiliary reflector 44 from the first auxiliary reflector 36 and exposure position are adopted selectively by moving forward and backward by a shade driving mechanism not shown.

In the embodiment, both of the first moving shade portion 66 and the second moving shade portion 68 are moved to the shade position at the time of low-beam emission, and at the time of high-beam emission, both of the first moving shade portion 66 and the second moving shade portion 68 are moved to the exposure position.

Even at adopting the constitution of the embodiment, the similar as the first embodiment is obtained.

The first moving shade portion 66 and the second moving shade portion 68 may be moved with interlocking or independently each other.

Next, a third embodiment the invention will be described.

Figure 12:
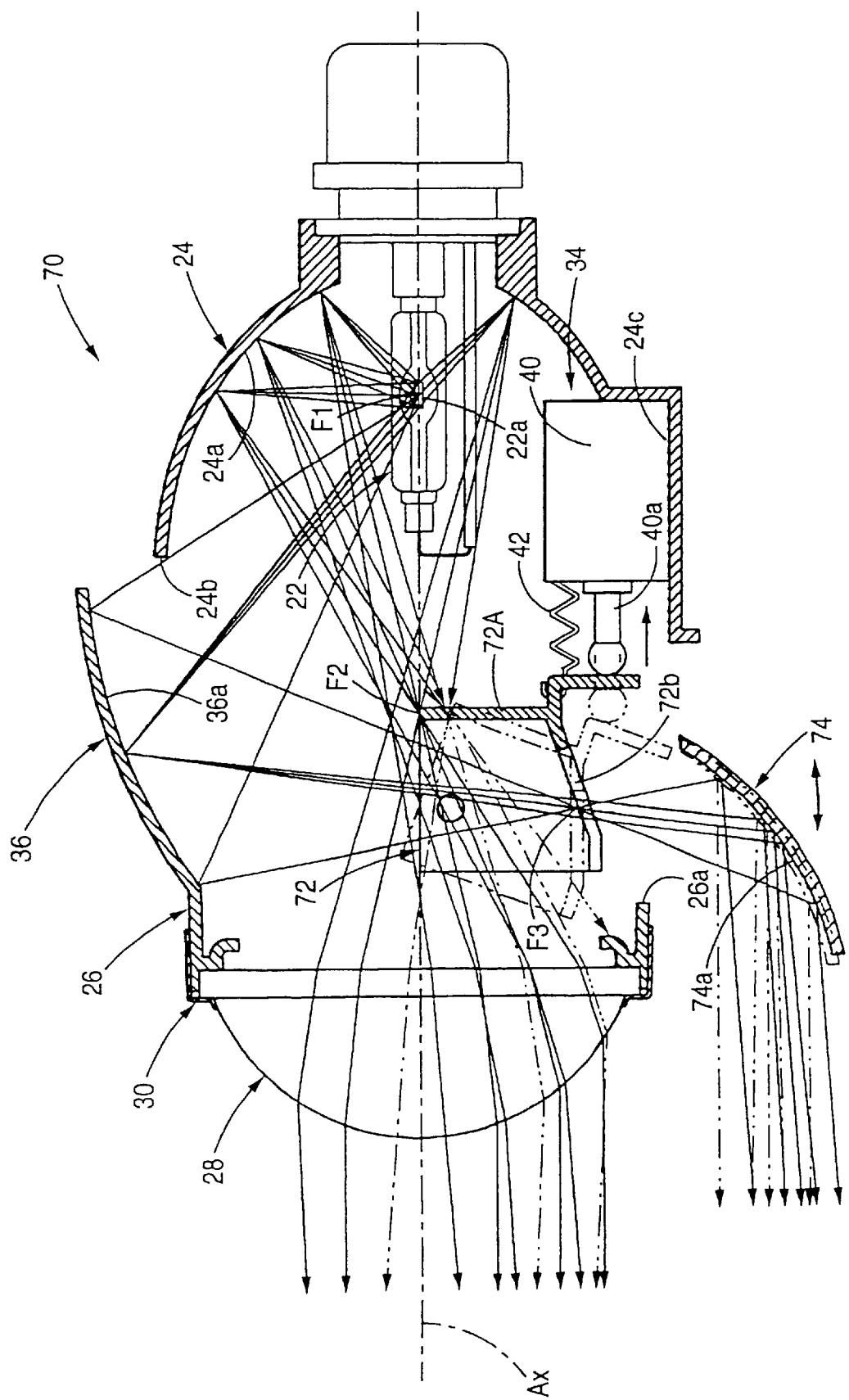
FIG. 12 is a side sectional view showing a single article of the lamp unit of the vehicle headlamp according to a third embodiment of the invention.

FIG. 12 is a side sectional view showing a single article of a lamp unit 70 of a vehicle headlamp according to the embodiment.

Although the lamp unit 70 according to the embodiment is similar as the lamp unit 20 according to the first embodiment as shown in the figure, constitution of a shade 72 and a second auxiliary reflector 74 are different from the first embodiment, That is, the shade 72 of the embodiment forms a cutout exposure portion 72b of roughly U shape at lower end portion of the shade body portion 72A. The cutout exposure portion 72b is formed at wide range from position corresponding to the through-hole 32b of the shade 32 of the first embodiment to a front end. Thus, even when the shade 72 is at any of the shade position and the exposure position, light directing to the second auxiliary reflector 74 from the first auxiliary reflector 36 comes to a reflective surface 74a of the second auxiliary reflector 74.

The reflective surface 74a of the second auxiliary reflector 74 is constituted as a diffusion reflective surface of right and left, and the second auxiliary reflector 74 is supported rotatably around horizontal axis extending to right and left directions passing the second focal point F3 of the first auxiliary reflector 36 to the holder 26. The second auxiliary reflector 74 is rotated by drive of a reflector driving mechanism not shown, is arranged at the position of the solid line of the figure at the time of low-beam emission, and at the time of high-beam emission, is arranged at the position of the broken line of the figure (the same position as the second auxiliary reflector 34 of the first embodiment).

Light from the first auxiliary reflector 36 coming to the second auxiliary reflector 74 is emitted forward as diffusion light spreading right and left directions at the reflective surface 74 thereof, and forms a long sideways auxiliary luminous distribution pattern P(A) as shown in FIG. 13. The auxiliary luminous distribution pattern P(A) is formed at lower position at the time of low-beam emission as the second auxiliary reflector 74 rotates downward than at the time of high-beam emission. Thus, the auxiliary luminous distribution pattern P(A) is superimposed at wide range by the low-beam luminous distribution pattern P(L) at the time of low-beam emission as shown in FIG. 13A, and at the time of high-beam emission, is superimposed at wide range by the high-beam luminous distribution pattern P(H) as shown in FIG. 13B.

When the constitution of the embodiment is adopted, emission quantity of light not only the high-beam luminous distribution pattern P(H) but also the low-beam luminous distribution pattern P(L) can be increased. In this case, diffusion angle of right and left of the auxiliary luminous distribution pattern P(A) may be set suitably by considering with comparing improvement effect of visibility (effect obtained when the diffusion of right and left is made narrow) by improvement of luminous intensity of the hot zone at the high-beam luminous distribution pattern P(H) and improvement effect of visibility (effect obtained when the diffusion of right and left is made wide) by uniformity of luminous intensity distribution at the low-beam luminous distribution pattern P(L).

Next, a fourth embodiment the invention will be described.

Figure 14:
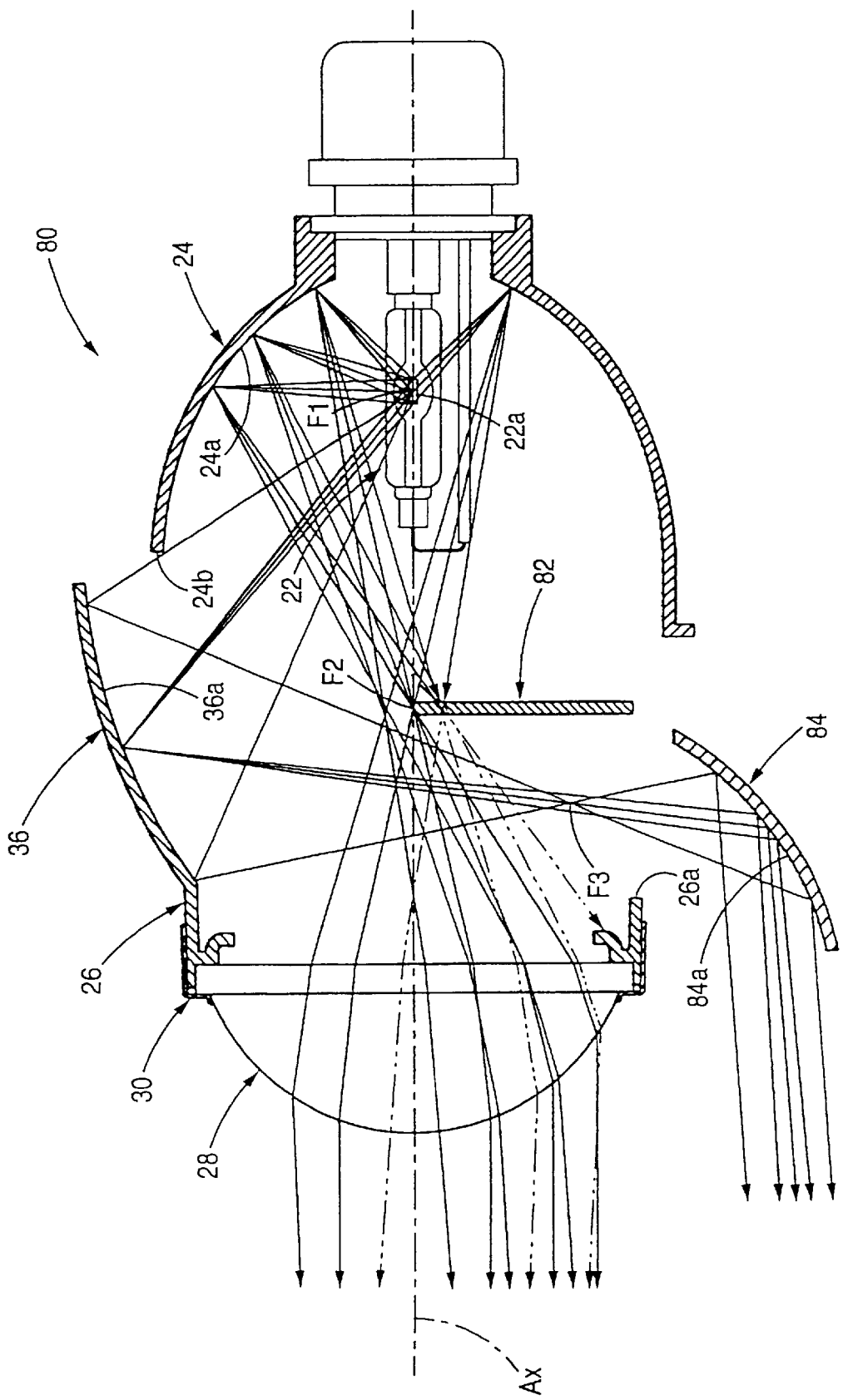
FIG. 14 is a side sectional view showing a single article of the lamp unit of the vehicle headlamp according to a fourth embodiment of the invention.
Figure 15A:
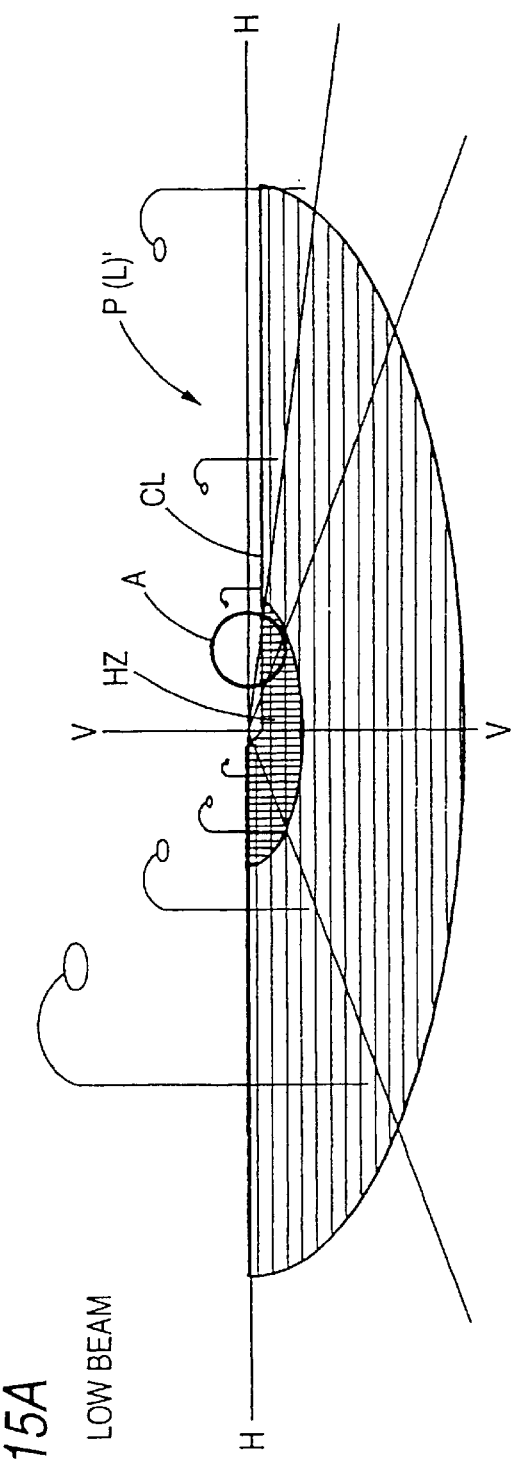
FIGS. 15A and 15B are similar views as FIGS. 7A and 7B, showing the prior art.
Figure 15B:
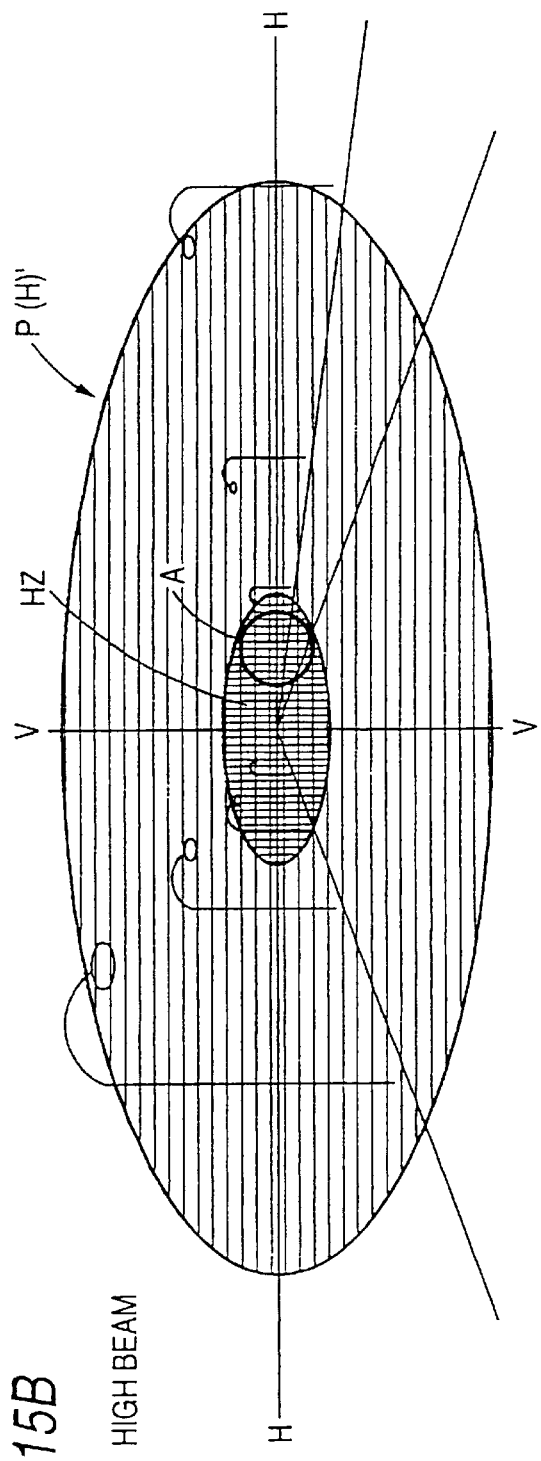

FIG. 14 is a side sectional view showing a single article of a lamp unit 80 of a vehicle headlamp according to the embodiment.

Although the lamp unit 80 according to the embodiment is a lamp unit for low-beam emission only, and the basic constitution is similar as the lamp unit 60 according to the second embodiment as shown in the figure, constitution of a shade 82 and a second auxiliary reflector 84 are different from the second embodiment, That is, the shade 82 of the embodiment has a constitution that a plate member corresponding to the first moving shade portion 66 of the shade 62 of the second embodiment is arranged and fixed at exposure position, and members corresponding to the fixed shade portion and the second moving shade portion 68 of the second embodiment are not provided.

The reflective surface 84a of the second auxiliary reflector 84 is constituted as a diffusion reflective surface of right and left, and the second auxiliary reflector 74 is formed downward to the second auxiliary reflector 44 of the second embodiment (the same angle position as the angle position at the time of low-beam emission of the second auxiliary reflector 74 of the third embodiment).

The lamp unit 80 according to the embodiment performs low-beam emission with the pattern always adding the auxiliary luminous distribution pattern P(A) to the low-beam luminous distribution pattern P(L) as shown in FIG. 13A similarly as the low-beam emission of the third embodiment.

In the case adopting the constitution of the embodiment, emission quantity of light can be increased so that the lamp unit 80 is functioned effectively as a lamp unit for low-beam emission only.

Even in the second to fourth modes for carrying out, by supporting the second auxiliary reflectors 44, 74, and 84 rotatably around vertical axis passing the second focal point F3 of the first auxiliary reflector 36 to the holder 26, direction of beam emission at the auxiliary luminous distribution pattern P(A) can be changed to right and left directions, thereby it is possible to perform beam emission control in a delicate manner corresponding to the travel condition of the vehicle.

Ii is possible to use the auxiliary luminous distribution pattern P(A) as a luminous distribution pattern for cornering lamp or a luminous distribution pattern for lane mark emission instead of using for increasing emission quantity of light of the high-beam luminous distribution pattern P(H) or the low-beam luminous distribution pattern P(L).

In the lamp unit 60 according to the second embodiment, presence of using the auxiliary luminous distribution pattern P(A) can be selected in any case of the low-beam emission and the high-beam emission by constitution moving the first moving shade portion 66 and the second moving shade portion 68 independently each other. Therefore, by combining suitably with constitution of the second auxiliary reflector 44 (plural use or movable use for example), the auxiliary luminous distribution pattern P(A) is possible to use variously responding on conditions of vehicle travelling.

What is claimed is:

1. A vehicle headlamp for emitting beams forward with predetermined luminous distribution patterns, comprising:

a lamp unit including a light source arranged on an optical axis extending in the longitudinal direction of a vehicle, a reflector for reflecting light from the light source forward a little to the optical axis, a projection lens provided in front of the reflector, and a shade which is provided between the projection lens and the reflector and used for shading part of the light reflected from the reflector;

a first auxiliary reflector which is provided above the optical axis Ax between the reflector and the projection lens, and reflects direct light from the light source downward; and a second auxiliary reflector which is provided under the optical axis between the reflector and the projection lens and reflects the light reflected from the first auxiliary reflector forward.

2. A vehicle headlamp as claimed in claim 1, wherein a reflective surface of the first auxiliary reflector is in the form of an elliptic spherical surface having a first focal point close to the light source, and a reflective surface of the second auxiliary reflector is in the form of a secondary curved surface having a focal point close to a second focal point of the reflective surface of the first auxiliary reflector.

3. A vehicle headlamp as claimed in claim 1, wherein the shade is movably provided between a shade position for shading part of the light reflected from the reflector and an exposure position for releasing the shading of the light, when the shade is at the shade position, the shade shades the light directed to the second auxiliary reflector from the first auxiliary reflector, whereas when the shade is at the exposure position, the shade allows to pass the light directed to the second auxiliary reflector from the first auxiliary reflector.

4. A vehicle headlamp as claimed in claim 3, wherein the shade has a through hole which allows to pass the light directed to the second auxiliary reflector from the first auxiliary reflector when the shade is at the exposure position.

5. A vehicle headlamp as claimed in claim 2, wherein the shade is movably provided between a shade position for shading part of the light reflected from the reflector and an exposure position for releasing the shading of the light, when the shade is at the shade position, the shade shades the light directed to the second auxiliary reflector from the first auxiliary reflector, whereas when the shade is at the exposure position, the shade allows to pass the light directed to the second auxiliary reflector from the first auxiliary reflector.

6. A vehicle headlamp as claimed in claim 5, wherein the shade has a through hole which allows to pass the light directed to the second auxiliary reflector from the first auxiliary reflector when the shade is at the exposure position.

7. A vehicle headlamp as claimed in claims 1, wherein the second auxiliary reflector is set movable.

8. A vehicle headlamp as claimed in claim 4, wherein said through hole is positioned at a position close to the second focal point of the reflective surface of the first auxiliary reflector.

9. A vehicle headlamp as claimed in claim 6, wherein said through hole is positioned at a position close to the second focal point of the reflective surface of the first auxiliary reflector.

10. A vehicle headlamp as claimed in claim 7, wherein said second auxiliary reflector is rotatable around a vertical axis passing the second focal point of the reflective surface of the first auxiliary reflector.

11. A vehicle headlamp as claimed in claim 7, wherein said second auxiliary reflector is rotatable around a horizontal axis passing the second focal point of the reflective surface of the first auxiliary reflector.

12. A vehicle head lamp as claimed in claim 1, wherein said first auxiliary reflector has a pair of reflective surfaces and said second auxiliary reflector has a pair of reflective surfaces.

* * * * *